April 24, 1962 W. HAUPT ET AL 3,031,103
METER ARRANGEMENT FOR FLUID DISPENSING APPARATUS
Filed Feb. 23, 1960 15 Sheets-Sheet 4
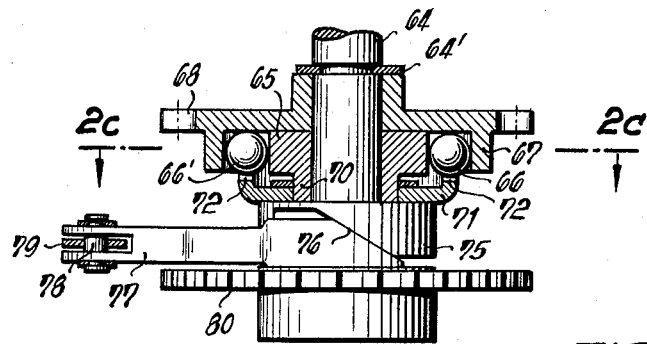
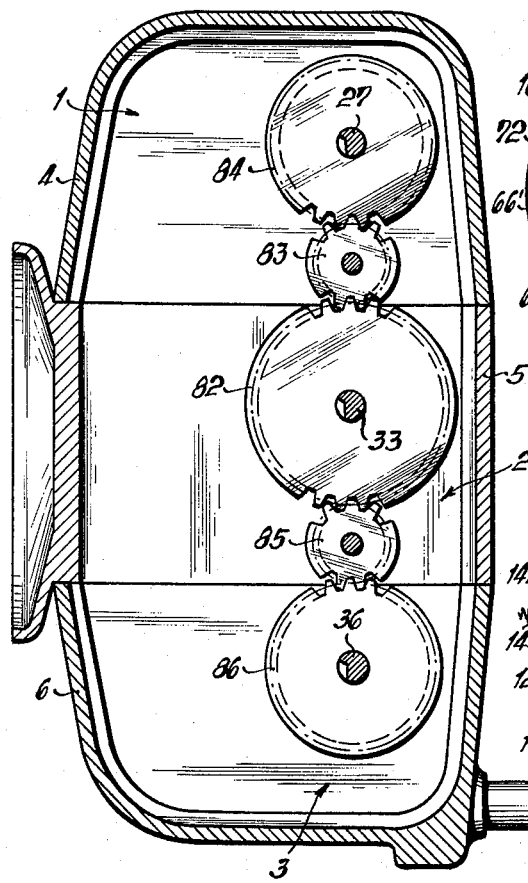
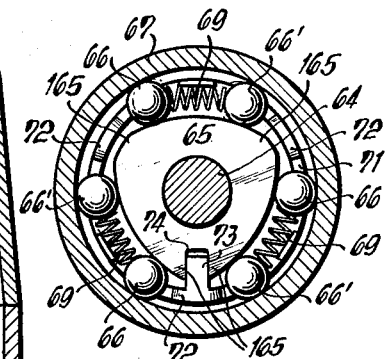
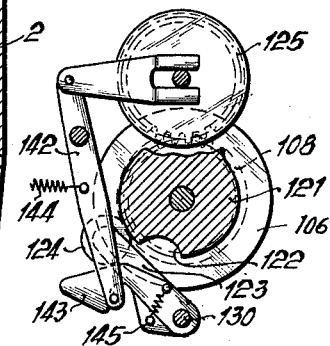
INVENTOR
Wilhelm Haupt, Heinz Kelch and Dieter Straub April 24, 1962 W. HAUPT ET AL 3,031,103
METER ARRANGEMENT FOR FLUID DISPENSING APPARATUS
Filed Feb. 23, 1960 15 Sheets-Sheet 5

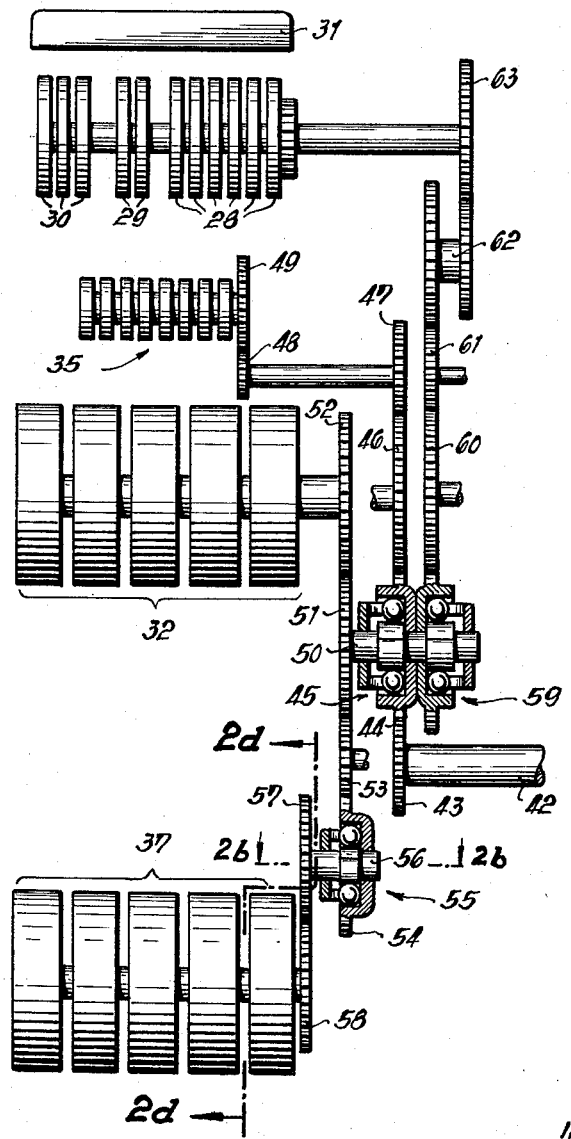

INVENTORS
Wilhelm Haupt, Heinz Keloh and
Dieter Straub
by Michael S. Striker
their attorney April 24, 1962 W. HAUPT ET AL 3,031,103
METER ARRANGEMENT FOR FLUID DISPENSING APPARATUS
Filed Feb. 23, 1960 15 Sheets-Sheet 6

INVENTORS
Wilhelm Haupt,
Dieter Straub
and Heinz Kelch

April 24, 1962   W. HAUPT ET AL   3,031,103
METER ARRANGEMENT FOR FLUID DISPENSING APPARATUS
Filed Feb. 23, 1960

INVENTORS
Wilhelm Haupt, Heinz Kelch and
Dieter Straub

INVENTORS
Wilhelm Haupt, Heinz Kelch and
Dieter Straub

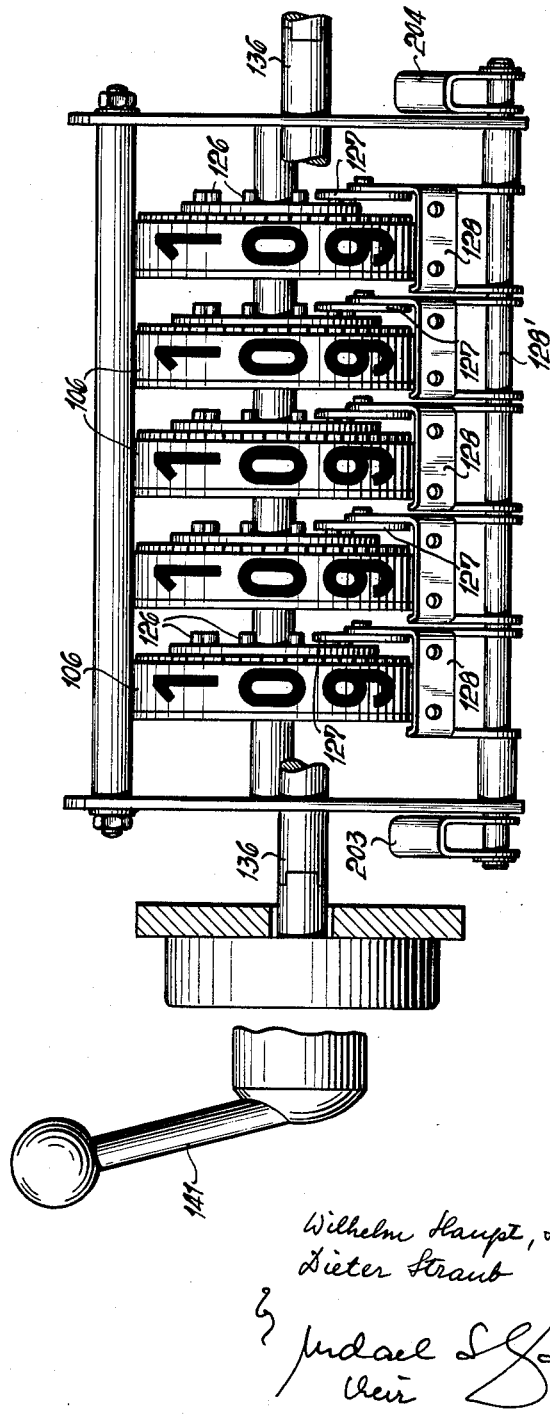

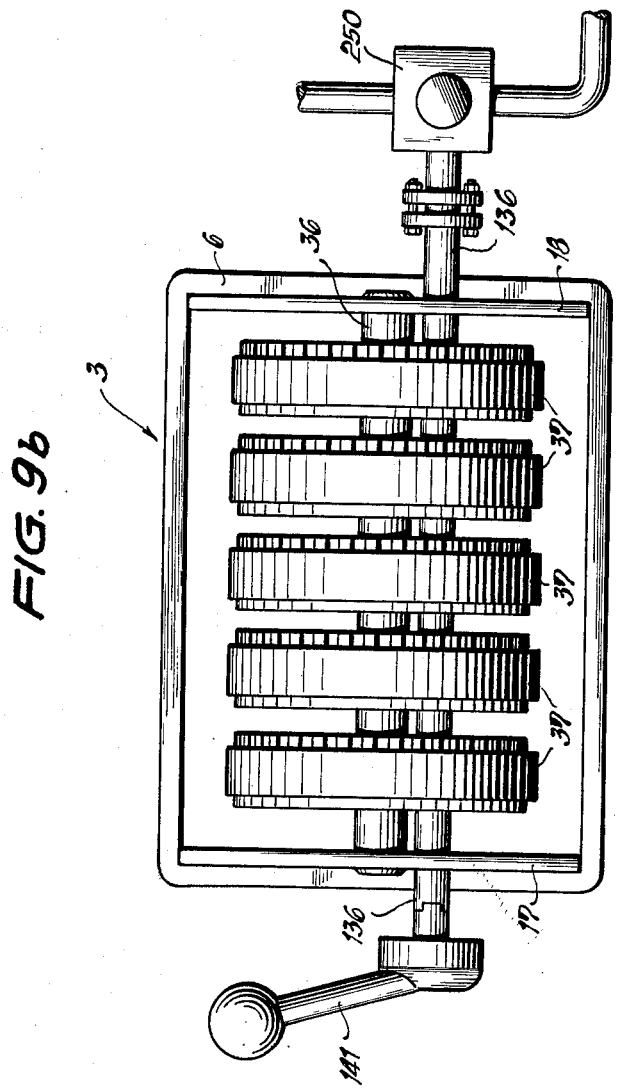

INVENTORS
Wilhelm Haupt, Heinz Kelch and
Dieter Straub

April 24, 1962   W. HAUPT ET AL   3,031,103
METER ARRANGEMENT FOR FLUID DISPENSING APPARATUS
Filed Feb. 23, 1960   15 Sheets-Sheet 12

INVENTORS
Wilhelm Haupt, Heinz Kelch and
Dieter Straub

April 24, 1962 W. HAUPT ET AL 3,031,103
METER ARRANGEMENT FOR FLUID DISPENSING APPARATUS
Filed Feb. 23, 1960 15 Sheets-Sheet 13
FIG.13
FIG.14
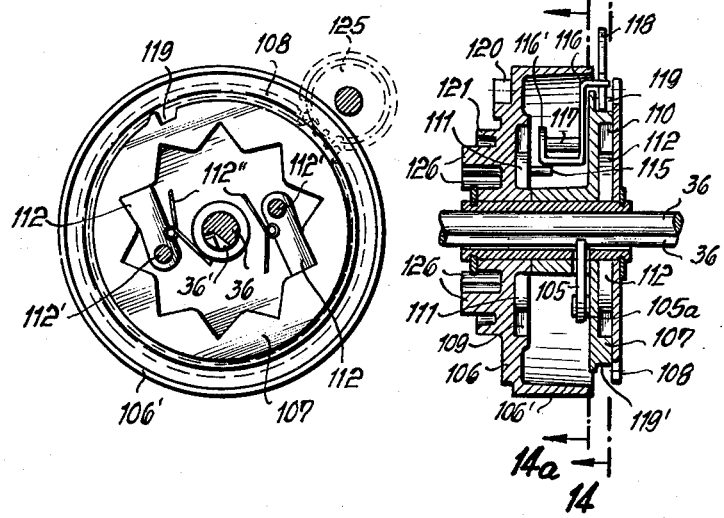
FIG.14a
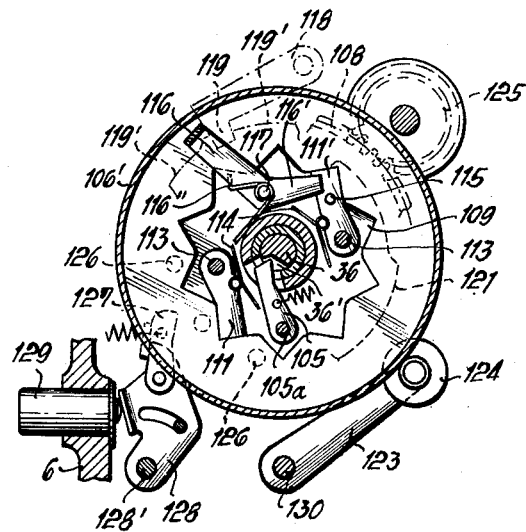
INVENTORS
Wilhelm Haupt, Heinz Kelch and
Dieter Straub
by Michael S. Striker
their attorney INVENTORS
Wilhelm Haupt,
Heinz Kelch and
Dieter Straub

United States Patent Office 3,031,103
Patented Apr. 24, 1962

1

3,031,103
METER ARRANGEMENT FOR FLUID
DISPENSING APPARATUS
Wilhelm Haupt, Heinz Kelch, and Dieter Straub, Villingen, Black Forest, Germany, assignors to Kienzle Apparate G.m.b.H., Villingen, Black Forest, Germany
Filed Feb. 23, 1960, Ser. No. 10,437
Claims priority, application Germany Feb. 21, 1959
18 Claims. (Cl. 222—20)

The present invention relates to a meter arrangement for apparatus by which a fluid is dispensed.

It is known to provide dispensing apparatus with a first meter for the dispensed quantity, and with a second meter on which the quantity of fluid to be dispensed can be pre-set. Meters of this type may be mounted in a common housing, which has the disadvantage that the customer is forced to buy both meters. Other arrangements according to the prior art provide a separate casing for each meter which necessitates separate operating means for each meter. Since all operating means must be operated in a certain order, they have to be connected outside of the casings by an interlocking arrangement to prevent an improper operation of the operating means.

The constructions of the prior art provide an arrangement in which the present second meter runs toward a zero position, and operates a closure valve to stop the dispensing of the fluid when arriving in the zero position. At the same time, the first meter which measures the dispensed amount is also stopped, which has the disadvantage that amounts of fluid running through the valve after the meters have stopped, are not measured, and consequently cannot be charged to the consumer. Substantial amounts may be lost in this manner particularly if the valve does not close tightly. Furthermore, the valve may occasionally not close at all, and the amount dispensed while the respective meters are stopped, cannot be determined.

It is one object of the present invention to overcome the disadvantages of the known meter arrangements for measuring amounts of dispensed fluid, and to provide a meter arrangement in which all required operations are controlled by a single operating means.

Another object of the present invention is to provide a meter arrangement for measuring a dispensed amount of fluid, including any amount of fluid discharged after the preset meter has arrived in its zero position in which the dispensing valve should have stopped the fluid discharge completely.

Another object of the present invention is to control the discharge valve by a present meter, but to measure the actually dispensed amount of fluid by another meter.

A further object of the present invention is to provide in addition to a preset meter, and a meter for measuring the dispensed fluid, printing means for printing a record of the amount of the dispensed fluid, and to control both meters and the printing means by a single operating means.

A still further object of the present invention is to provide a single operating means for the above explained purpose, and to effect the necessary operations by first turning the operating means from a first position through a second position and through further 360° again to the second position and by then turning the operating means in the opposite direction back to the first position.

With these objects in view, the present invention relates to a meter arrangement which comprises control means for controlling the dispensing of a fluid; first meter means for measuring a dispensed quantity of the fluid; second meter means settable to a selected preset position corresponding to a selected amount to be dispensed, and

2 operatively connected to the first meter means to move from the present initial position to a zero position while a dispensed quantity is measured by the first meter means; and a single operating means operatively connected to the first and second meter means for simultaneously operating the same. The second meter means is operatively connected to the control means to actuate the same to effect stopping of the dispensing of the fluid when the second meter means arrives at its zero position, and preferably printing means are provided which are operatively connected to the first meter means for movement with the same between printing positions representing the respective amounts of dispensed fluid.

The operating means is operatively connected to the first and second meter means so that the same are positive while the operating means is in a first control position. The operating means is turned through an angle smaller than 360° to a second control position, and from there further turned beyond the second control position through an angle of 360° to assume again the second control position. The second meter can be set to the amount of fluid to be dispensed when the operating means is again in the second control position. The operating means is operatively connected to the first and second meter means to return the first meter means to the initial zero position and the second meter means to an initial position (to which it was set before the preceding dispensing operation) while turning through 360° from the second control position again to the second control position. The operating means is also connected to the printing means to actuate the same during movement from the first to the second control position through the selected smaller angle to effect a printing operation of the printing means, and to clear the printing means during the further turning movement through 360°.

After the second meter means has been set in the second control position of the operating means to a newly selected amount of fluid to be dispensed, or left in the position preset before the preceding dispensing position, the operating means is turned back from the second control position to the first control position in which the dispensing operation is carried out.

In accordance with another aspect of the present invention a meter arrangement comprises control means with a valve for controlling the dispensing of a fluid; first meter means for measuring the dispensed quantity of the fluid; second meter means settable to a preset position corresponding to a selected amount of fluid to be dispensed and operatively connected to the control means to actuate the same to effect stopping of the dispensing of the fluid when the second meter means arrives at its zero position; and coupling means having a coupling position for operatively connecting the second meter means with the first meter means so that the second meter means moves to the zero position while a dispensed quantity is measured by the first meter means. In accordance with the present invention, the coupling means is connected to the second meter means in such a manner as to move to a disengaged position when the second meter means arrives at the zero position thereof whereby the first meter means is free to measure excess amounts of the fluid dispensed after the second meter means has arrived in the zero position thereof and has actuated the control means to effect stopping of the dispensing of the fluid.

During the turning of the operating means through an angle smaller than 360° between the first control position and the second control position, several locking means are released by which improper operations of the apparatus are prevented in the first control position of the operating means. When the operating means is further turned through 360°, and for example altogether through an angle of 410°, the number wheels of the first measuring meter, and printing wheels of the printing means are turned back to zero position, while the number wheels of the second control meter are turned back to the number previously appearing thereon. When the operating means is the second time in the second control position, corresponding through a turning through first 50°, and then 360°, the control meter can be set in accordance with the desired amount to be dispensed. When the operating means is now turned back from the second control position to the first control position, for example through an angle of 50°, the previously released locking means are again locked and prevent an improper operation of the arrangement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2a is a schematic developed view illustrating transmission means connecting the operating means with the meters and printing means of the embodiment shown in FIG. 1;

FIG. 2b is a sectional view taken on line 2b—2b in FIG. 2a;

FIG. 2c is a cross-sectional view taken on line 2c—2c in FIG. 2b;

FIG. 2d is a side view partly in section illustrating a detail of a control meter used in the embodiment of FIG. 1;

FIG. 3 is a sectional view taken on line 3—3 in FIG. 1 and illustrating transmission means connecting the meters and printing means;

FIG. 9a is a front view illustrating the control meter on which the amount of fluid to be dispensed are preset;

FIG. 9b shows the connection between the control meter and the dispensing valve, FIGS. 10, 11 and 11a and 12 are cross sectional views taken on parallel planes and illustrating the control meter as viewed in a direction opposite from the direction in which FIG. 9 is viewed;

FIG 13 is an axial sectional view illustrating a number wheel construction of the control meter;

FIG. 14 is a cross-sectional view taken on line 14—14 in FIG. 13;

FIG. 14a is a cross-sectional view taken on line 14a—14a in FIG. 13;

Figure 15:
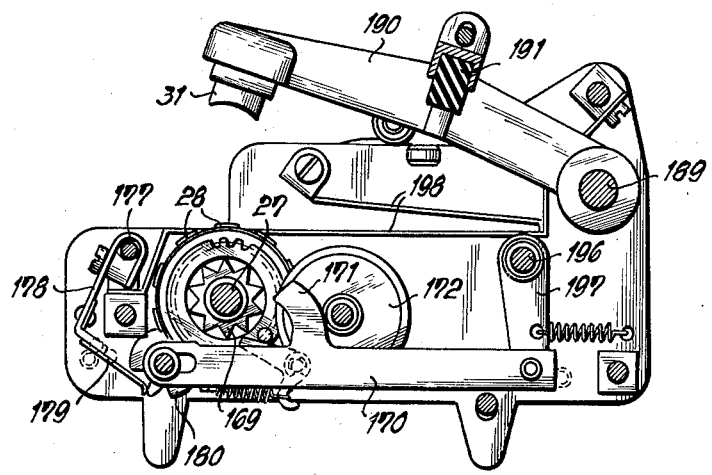
Figure 16:
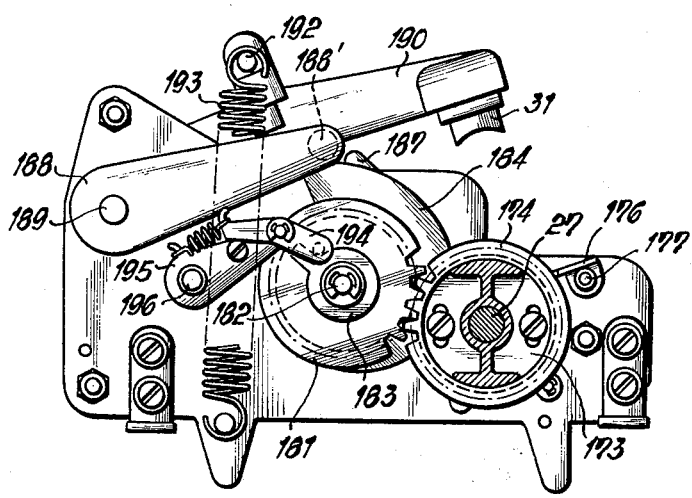
Figure 16A:
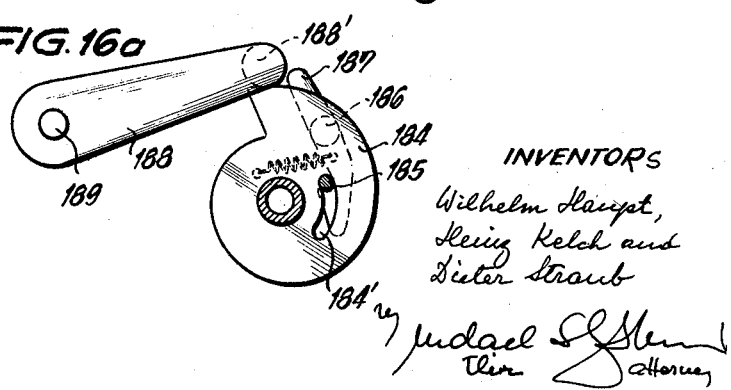
Figure 17:
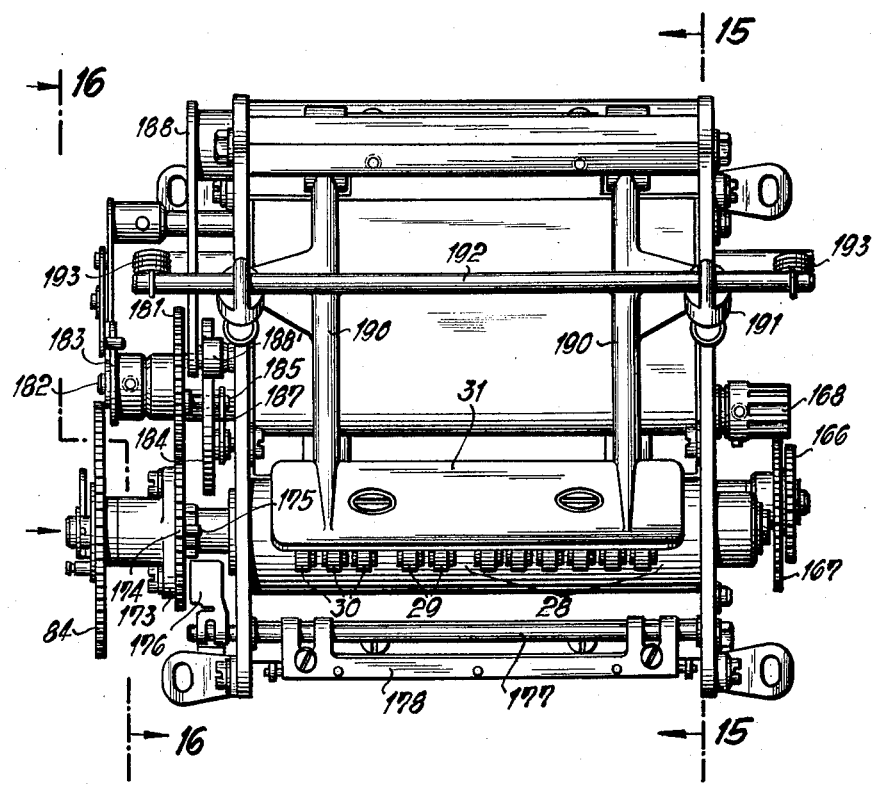

FIGS. 15 and 16 are cross-sectional views taken on lines 15—15 and line 16—16 in FIG. 17, respectively;

FIG. 16a is a side view illustrating a detail of the printing means; and

Figure 1:
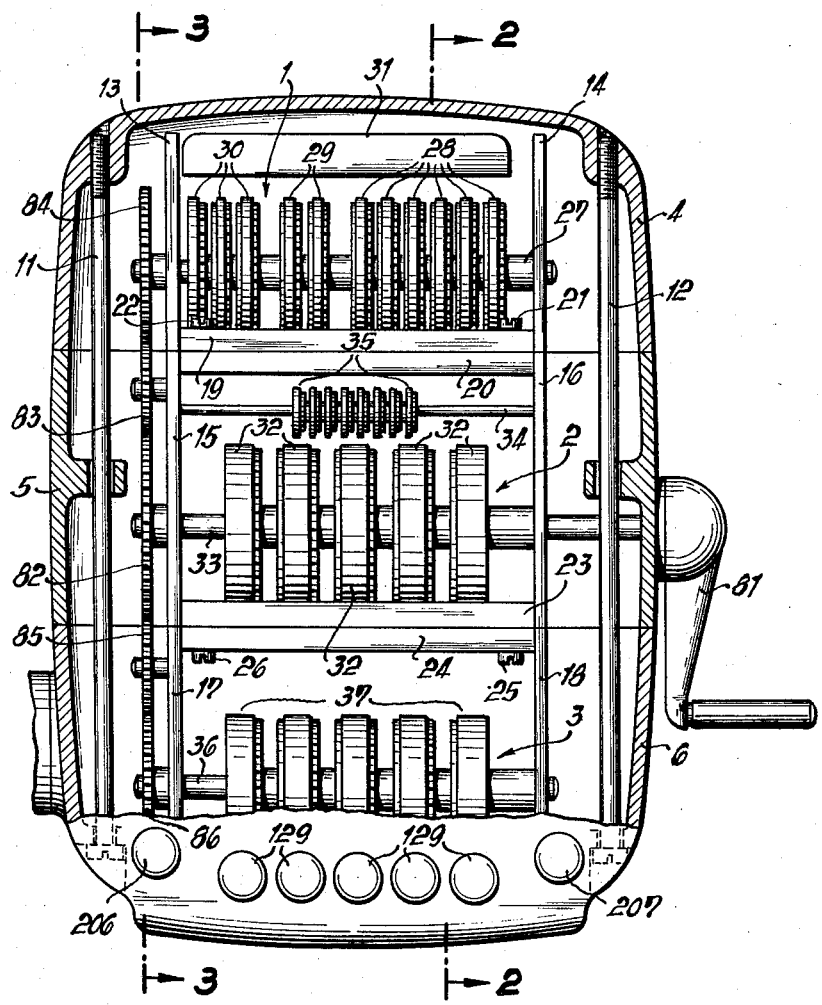
FIG. 1 is a front elevation, mainly in section, of an apparatus according to the preferred embodiment of the present invention.

FIG. 17 is a side elevation of the printing means viewed in the embodiment of FIG. 1.

Figure 2:
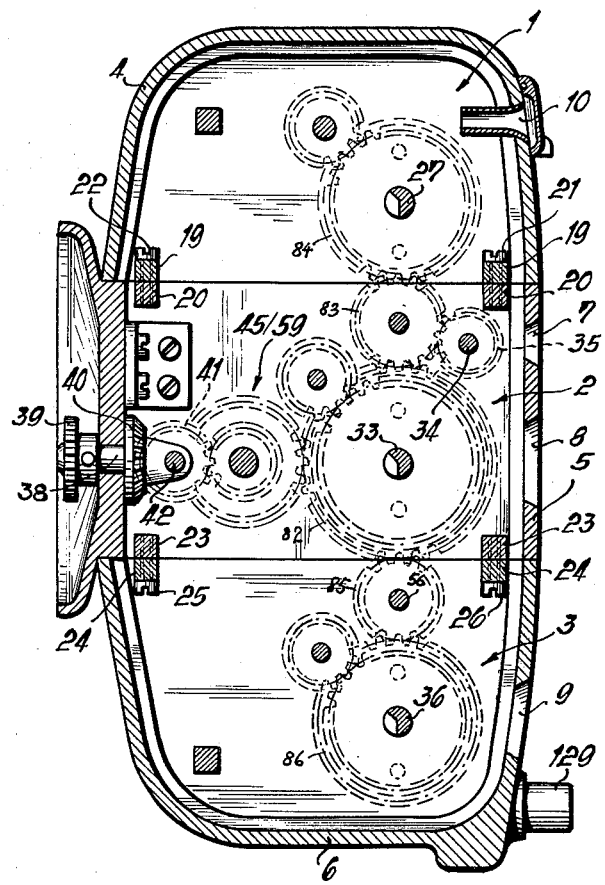
FIG. 2 is a section taken on line 2—2 in FIG. 1.

Referring now to the drawings, and more particularly to FIGS. 1 to 3, a casing is made of three casing parts 4, 5 and 6 which are provided with windows 7, 8 and 9, and a slot 10 for insertion of paper. Long bolts 11 and 12 hold the three parts of the casing together. Pairs of supporting plates 13 and 14, 15 and 16, and 17 and 18 are provided in the casing. The supporting plates have ledges 19, 20 and 23, 24. Screws 21, 22, 25 and 26 pass through pairs of adjacent ledges and attach the supporting plates to each other. The pair of supporting plates 13, 14 supports the shaft 27 of printing means 1, the supporting plates 15, 16 support the shaft 33 of the main meter 2, and shaft 34 of a totalizer 35, and support plates 17, 18 support the shaft 36 of the control meter 3 on which the amount to be dispensed is preset. Shafts 27, 33, and 36 are connected by a gear train including gears 82, 83, 84, 85 and 86. An operating handle means 81 is also mounted on the casing part 5, and operatively connected to the meters 2 and 3, and to the printing means 1, as will be described hereinafter.

Shaft 27 supports eleven printing wheels. Six printing wheels 29 represent the dispensed amounts, two printing wheels 29 carry types representing the station where the apparatus is located, and three printing wheels 30 have numbers for consecutively numbering the printed slips on which the dispensed amounts of fluid are recorded. Printing wheels 29 are set only once for the respective station, which may be a gasoline station, while printing means 28 turn with the meter 2 to represent the amount of fluid dispensed. The printing means further include a printing hammer 31 which, when actuated, presses a paper sheet against the types n the printing wheels.

Shaft 33 of the main meter 2 turnably supports the number wheels 32. Another set of number wheels 35 is mounted on the shaft 34 and constitutes a totalizer for adding all amounts measured by the meter 2. Totalizer 35 is not cleared when meter 2 is cleared, as will be described hereinafter.

The control meter 3 has a set of number wheels 37 mounted on shaft 36, and each number wheel 37 can be set by manually operated push-buttons 129 to a selected position, so that the set number wheels 37 represent the amount selected to be dispensed.

As shown in FIG. 2, a driven gear 39 drives a shaft 38 which is mounted in the casing part 5. A beveled gear 40 is fixed to shaft 38 and drives another beveled gear 41 which is fixed to a shaft 42. FIG. 2a shows the manner in which the meters and printing means are operatively interconnected to be driven from shaft 42. Shaft 42 carries a gear 43 which meshes with a gear crown 44 on a coupling means 45 which in coupled position drives shaft 50 on which a gear 51 is fixed. The gear crown 44 of coupling means 45 also meshes with a gear 46 which drives a pinion 47. A shaft connects pinion 47 to a pinion 48 meshing with a gear 49 which drives the totalizer 35. Consequently, the totalizer 35 is directly driven from shaft 34. The coupled gear 51 meshes with a gear 52 which drives the number wheel of the lowest order of the meter 2. Gear 51 also meshes with a gear crown 54 on a coupling means 55 which in coupled position drives shaft 56 which is connected by gear 57 and 58 to the number wheel 37 of the lowest order of control meter 3.

Shaft 50 also cooperates with a coupling means 59 whose gear crown meshes with a gear 60. A gear train, 61, 62, 63 connects gear 60 with the first printing wheel 28 of the printing means 1. Coupling means 45, 55, and 59 are constructed in such a manner as to be able to transmit rotary movements in opposite directions. However, each coupling means can be shifted to a disengaged position. From the above description of the apparatus shown in FIG. 2, it will be apparent that the control meter 3, the main meter 2, the totalizer 35, and the printing means 1 are all simultaneously driven from shafts 42 and 38 when the coupling means 45, 59, and 56 are in coupled position, and that by shifting of coupling means 55 to a disengaged position control meter 3 can be separated from the main meter 2. Furthermore, main meter 2 can be separated by operation of coupling means 45 from the drive 38, 42, and the printing means 1 can be separated from the drive by disengagement of coupling means 59.

Coupling means 45 and 59 are mainly operated when the main meter 2 and the printing means are cleared. Coupling means 55 is disengaged to separate the drive means 38, 42 from the control meter 3 when the same has reached its zero position which indicates that the selected amount has been dispensed. When coupling means 55 is disengaged, the main meter 2 can continue to operate and to indicate any amount of fluid dispensed after the control meter has reached its zero position.

A preferred embodiment of a coupling means which can be advantageously used as coupling means 45, 55 or 59 will now be described with reference to FIGS. 2b and 2c. The shaft 64 in FIGS. 2b and 2c corresponds either to shaft 56 or to shaft 50, and the gear crown 68 in FIGS. 2b and 2c corresponds either to the gear crown 54 or to the gear crown 44.

Shaft 64 is fixedly connected to a cam 65 which has three peripheral cam track portions 165. Pairs of coupling ball members 66 and 66′ are mounted on the cam track portions 165, respectively, and are forced apart by springs 69. A cage member 67 having a circular inner surface surrounds the cam 65, and due to the shape of the endless cam track of cam 65, the central portions of the cam track portions 165 are farther spaced for the circular inner surface of the cage member 67 than the ends of the respective cam track portions 165. Consequently, the coupling balls 66 and 66′ are normally wedged between the cam track portions 165 and couple the cage member 67, and the gear crown 68 thereon, to cam 65 and shaft 64. Since pairs of coupling balls 66, 66′ are provided, such coupling is effective in opposite directions of rotation.

A shifting means is provided for shifting the coupling members 66, 66′ to a position in which the coupling means is disengaged. Cam member 65 has an axially extending recess 74 in which a guide ridge 73 of the shifting means is slidably mounted. The shifting means includes three wedge members 72, each of which is located between two coupling members of different pairs of coupling members. A plate 71 connects the wedge members 72, and is attached to a member 75 provided with an inclined face 76. A shifting member 77 has a corresponding matching inclined face at one end cooperating with face 76, while the other end of shifting member 77 has a pivot pin 78 on which a control member 79 is mounted. When control member 79 is operated, shifting member 77 effects axial movement of member 75 and shifting of the wedge member 72 into the spaces between adjacent coupling balls 66 and 66′ whereby the balls 66, 66′ of each pair are pushed toward each other against the action of springs 69 and into a position located on the center portion of each cam track portion 165, and since such center portion is farther spaced from the cage member 67, the coupling is disengaged. A gear 80 is fixedly secured to shaft 64, and corresponds, for example, to gear 57 of coupling 55. An annular member 81 is secured to shaft 64 and prevents axial movement of the cage member 67 and gear crown 68. When the coupling is disengaged, cage member 67 and gear crown 68 are freely rotatable on shaft 64.

The coupling is shown in FIG. 2c in coupled position in which the coupling balls 66 transmit the rotary motion from shaft 64 to gear 80 during rotation in clockwise direction, while coupling balls 66′ transmit the rotary motion during turning movement in counter clockwise direction.

When shifting member 77 is retracted, springs 69 force the pairs of coupling balls 66, 66′ apart into the wedged position shown in FIG. 2c and the respective coupling balls 66 and 66′ of different pairs urge the wedge member 72 in axial direction into an inoperative position so that the coupling is engaged.

The construction shown in FIGS. 2b and 2c corresponds to the coupling means 55. It will be understood that it is possible to arrange two coupling means of the described type on shaft 50 as shown for coupling means 45 and 59. Each coupling means 45 and 59 has an independent control member 79 and can be operated independently of the other coupling means.

Figure 7:
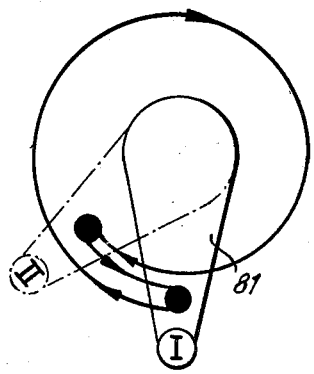
FIG. 7 is a schematic front view illustrating the operating means and its turning movement between the two control positions thereof.

The operating means 81 is connected to the shafts of the meters and printing means by the gear train 82 to 86, as shown in FIG. 1. As shown in FIG. 7, the operating means 81 has a first control position I and a second control position II which is spaced from control position I an angle of, for example, 50°. During operation, the operating means is turned in clockwise direction beyond control position II and further in the same sense through an angle of 360° until it again arrives in control position II. This corresponds to a turning of operating member 81 through an angle of 410°. When operating member 81 is turned through 410° after a dispensing operation, meter 2 is cleared, and assumes its initial zero position, and control meter 3 is turned from the zero position it assumes at the end of the dispensing operation to the previously set initial position it had before the preceding dispensing operation. A newly selected amount may now be set on control meter 3, if desired, and in any event, operating means 81 is now turned in the opposite counter clockwise direction from the control position II to control position I in which the apparatus is in operative condition. During the previous clockwise turning through 50° between positions I and II, certain locking devices preventing an improper operation of the apparatus were released, and during the counter-clockwise movement through 50° from position II to position I, such locking means are again locked. When the operating means 81 has been turned through 410° and is in the control position II, the meter 3 can be set to a new selected amount to be dispensed.

Figure 8:
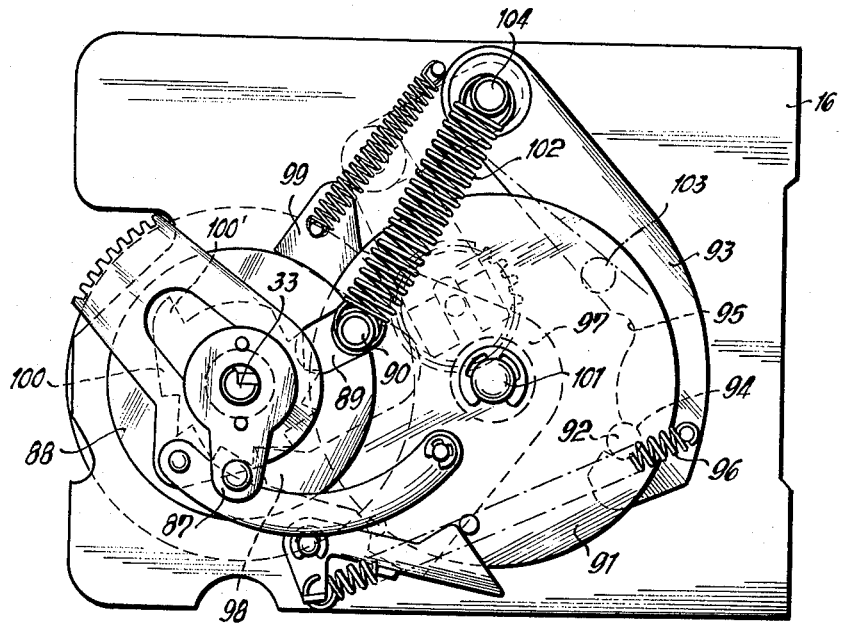
FIG. 8 is a side view illustrating a locking arrangement for locking the main meter by which the dispensed amount of fluid is measured.

The locking means by which incorrect operation of the apparatus is prevented in control position I, cooperate with the main meter 2. As shown in FIG. 8, a coupling member 87 is connected to the shaft 33 of meter 2. When operating means 81 is turned in clockwise direction, a slotted disc 88 turns with shaft 33. Disc 88 has a slot 89 into which projects a pin 90 secured to a disc 91. Diametrically opposite pin 90, another pin 92 is secured to the other side of disc 91. An arresting lever 93 has two recesses 94, 95 cooperating with pin 92, and is urged by spring 96 into engagement with pin 92.

A latch 97 has two pawl projections 98, 99 cooperating with the teeth of a locking wheel 100. Latch 99 is mounted on a pin 101 for rocking movement and prevents rearward turning of shaft 33 and operating means 81 before operating means has turned through the full angle of 410° to arrive the second time in the control position II. A turning beyond this angle is not possible since at the beginning of the turning movement projection 98 engages the teeth of blocking wheel 100, while at the end of a turning movement projection 99 has been moved into a position located in the path of the projection 100′ on locking wheel 100. In this position, latch 97 is locked by a catch 97′ actuated by spring 96.

Slot 89 of slotted disc 88, and pin 90, effect turning of disc 91 until the pin 90 moves under the action of spring 102 out of slot 89 and starts sliding on the periphery of disc 88 during turning movement of operating means 81. Due to the turning of disc 91, pin 92 moves out of recess 94 of lever 93 so that it passes the second recess 95 and stops at the position 103 indicated in dash and dot lines whereby lever 93 is turned in a small angle in counter clockwise direction. Since lever 93 is non-turnably mounted on shaft 104, the rocking movement of lever 93 is transferred to shaft 104.

Shaft 104 carries two operating levers 79 for the couplings 45 and 59 so that the same can be operated in the manner explained with reference to FIGS. 2b and 2c. The rocking movement of lever 93 effects disengagement of coupling means 45 and 59. When operating means 81 has turned through an angle of about 410° and has arrived in the second control position II, pin 90 snaps again into slot 89 of disc 88, and pin 92 snaps into the recess 95 and it is there arrested by the force of the spring 96.

When operating means 81 is now turned by the operator in counter clockwise direction back to the control position I, the above described elements assume again the position illustrated in FIG. 8, and the meter 2 is again in operative position.

As previously explained, the turning movement of the operating means 81 is transferred from shaft 33 through gears 82, 85 and 86 to the shaft 36 of the control meter. Shaft 36 has a groove 36' into which the zero setting pawl 105 falls during the clearing operation so that the number wheels of the control meter 3 turn with the operating means 81. Member 105 is best seen in FIG. 13, which also shows the construction of the number wheels 37 of control meter 3. Each number wheel includes two parts 106 and 107, and a drive gear 108. Each part 106, 107 has an inner gearing 109, 110, respectively cooperating with pawls 111, 111' and 112, respectively. Pawls 111 and 111' are mounted on pins 113 which are secured to part 106 and are turned by springs 114 into engagement with the inner gear 109.

An angular lever 116 is turnably mounted on a pin 117 and has a projection 116' which normally is located in the path of movement of a pin 115 which is secured to pawl 111'. In this manner, a disengagement between pawl 111' and gear 109 is prevented. At the end of the clearing operation, lever 116 is turned in counter clockwise direction by a lever 118 so that lever 116 assumes the position shown in FIG. 14a.

Pawls 112 are turnably mounted on pins 112' and are urged by springs 112'' into engagement with the inner gear 110. Pins 112' are secured to the drive gear 108 as best seen in FIG. 14. Part 107 has an annular surface 119' with a recess 119 into which the latch lever 118 falls at the end of the clearing operation to lock part 107 against turning movement.

Figure 12:
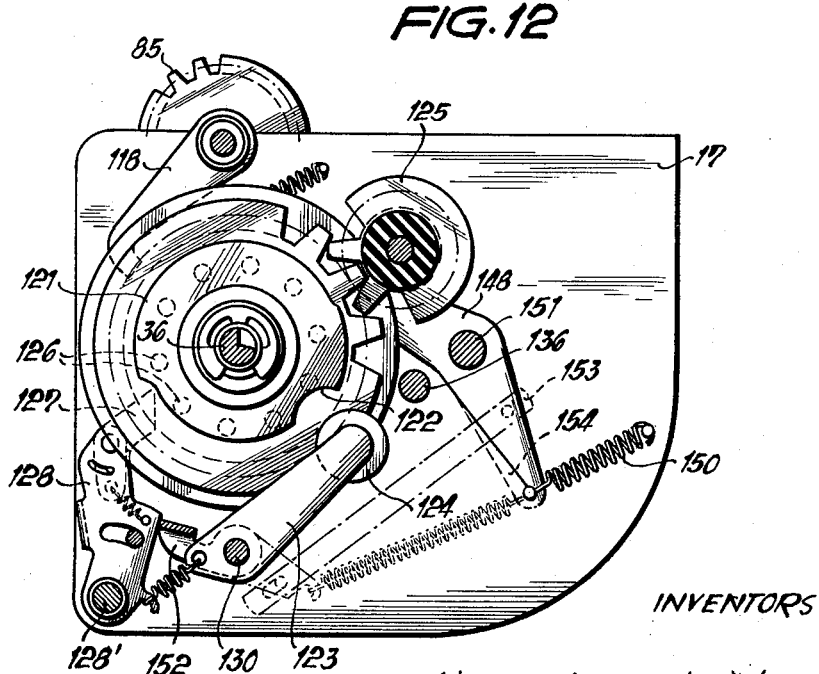

Part 106 has in addition to the tens-transfer projection 120, an annular surface 121 with a radial recess 122, best seen in FIGS. 2d and 12. The number wheel of the lowest decimal order of the control meter 3 has in addition to the recess 122, two radially stepped cam portions, best seen in FIG. 12 on which runs the roller 124 of a lever 123.

Gear means 125 mesh with the drive gears 108 and cooperate with a tens-transfer projection 120 to effect the tens-transfer from the number wheels of the lower orders to the number wheels of the higher order. Elements 125 are not retracted during the clearing operation. Part 106 has ten uniformly spaced pins 126 arranged along a circle, which serve for the setting of the number wheels, and are operated by the shifting pawls 127 of the manually operated lever 120 which are turnably mounted on a shaft 128'. A set of push buttons 128 is mounted on the housing 6 for operating levers 128 for the purpose of setting the number wheels in the respective orders of the control meter.

When shaft 36 is turned in clockwise direction during the clearing operation, part 107 is turned by pawl 105 which engages a groove in shaft 36 as best seen in FIG. 14a, and at the same time part 106 is turned through pin 117, projection 116' of lever 116, and pawl 111' which engages the inner gear crown 109.

Wheel 108 remains at a standstill and pawls 112 are urged out of the engaging position thereof by springs 112''. When the turning movement of the operating means in clockwise direction as viewed in FIG. 7 is terminated, the zero stop lever 118 is again located in recess 119, pawl 116 is retracted so that pin 115 of pawl 111' is released, part 106 can be set by the manually operated push buttons 129 through members 127, 128 and pins 126 to a new amount of fluid which is to be dispensed. The number wheels have indicating numbers 1 to 10 which are visible through a window 9 in casing 6 (see FIG. 6).

When the operating means 81 is turned in counter clockwise direction between positions II and I, lever 118 turns outwardly in clockwise direction, so that lever 116 assumes its normal position under the action of spring 116''. In this position, pawl 111' is again blocked.

Figure 11A:
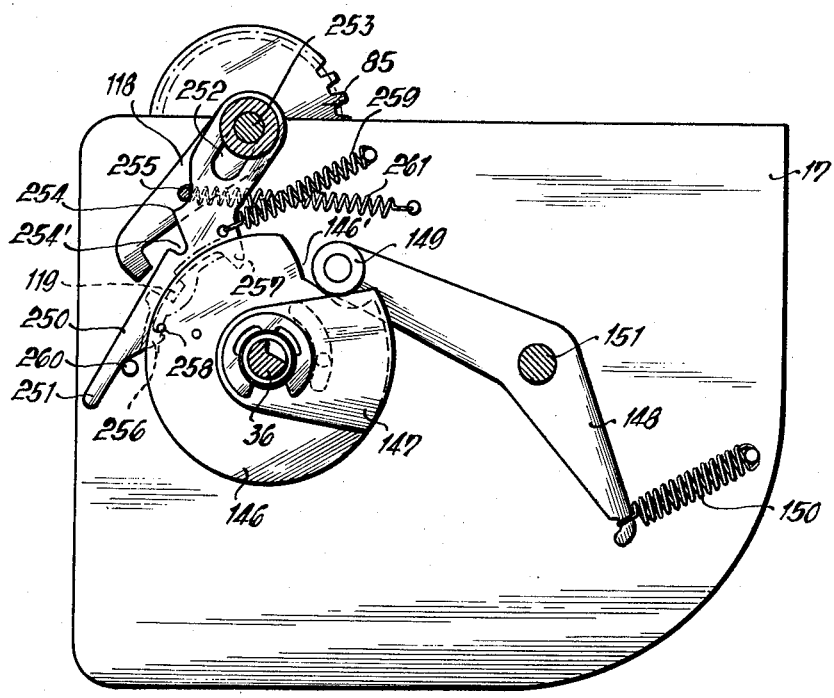

The movement of the zero stop lever 118 is controlled by a disc 146 and an associated lever 250 as best seen in FIG. 11a. The disc 146 has a peripheral recess 146' and turnably supports a sector-shaped member 147. Lever 148 is non-turnably mounted on shaft 151 and has a roller 149 which is urged by spring 150 into engagement with the peripheral surface of the control disc 146. Due to the turning movement of disc 146 during the clearing operation, the sector 147 temporarily covers the peripheral recess 146'. The lever 250 has a finger 251 at one end and is rotatably mounted on shaft 253 by means of a longitudinal slot 252 at its upper edge. Lever 250 has a cam-shaped cut-away portion 254 by means of which it cooperates with bolt 255 on one of the zero stop levers 118. At its lower edge lever 250 has two noses 256, 257, which are alternatively in contact with a bolt 258 fastened to the disc 146.

FIG. 11a shows the position of lever 250, disc 146 and zero stop lever 118, while the control meter is in operative position. A spring 259 draws a lever 250 against a stop 260 fastened to plate 17. Spring 261 is fastened to bolt 255 of the zero stop lever 118 and draws the former into engagement with a cam-shaped portion 254 of lever 250. When disc 146 is turned in clockwise direction for the purpose of zeroising, bolt 258 presses lever 250 upwards since bolt 258 cooperates with nose 257 of lever 250. Because of this movement of lever 250 bolt 255 of zero stop lever 118 slides along the cam shaped portion 254 and drops into the cut-out portion 254'. The nose of zero stop lever 118 now slides on the peripheral surface 119' of the number wheel until it drops into the recess 119. After zeroising has been completed, that means after one revolution of disc 146 by approximately 410° the backward rotation of disc 146 by about 50° commences. Pin 258 moves in counterclockwise direction and draws lever 250 back to the position shown in FIG. 11a by acting on nose 256. During this return movement bolt 255 is moved along cam-shaped portion 254 against the effect of spring 261, so that the zero stop levers 118 are returned to the position shown. The number wheels are again free to rotate.

In order to prevent an erroneous operation of the manually operated setting means 128, 129 during running of the meter, a bar 152 is mounted on shaft 130, and is connected through a link 153 with a lever 154. Lever 154 is non-turnably mounted on shaft 151 and performs the same motions as lever 148. Due to the motions of lever 154, bar 152 is retracted in upward direction during the clearing operation, and as long as operating means 81 is in control position II. Due to the retraction of bar 152 in control position II, the manually operated setting means 128 can be operated, whereas in the control position I, bar 152 is in the position shown in FIG. 12, and locks the manually operated setting means 129, 128.

The flange 121 of each number wheel 37 cooperates with a lever 123, see FIGS. 2d, 12 and 14a. All levers 123 are fixed on shaft 130 and extend parallel to each other. Another lever 131 is fixed on the shaft 130 (see FIG. 10), and is urged by spring 132 to turn shaft 130 in clockwise direction. A lever 135 having a stepped surface is turnably mounted on the shaft 130 and is connected by a pin 133 and a torsion spring 134 with lever 131. A shifting lever 137 is non-turnably mounted on shaft 136 and is urged by a spring 138 against a stop 139 (see FIG. 10). A pin 140 on shifting lever 137 cooperates with the steps 135' of stepped lever 135.

Figure 9:
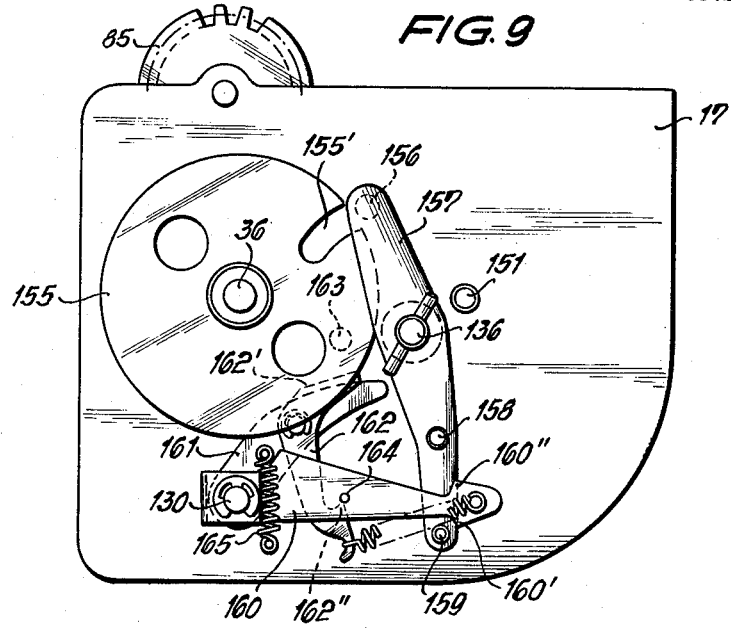
FIG. 9 is a cross-sectional view illustrating details of the control meter.
Figure 10:
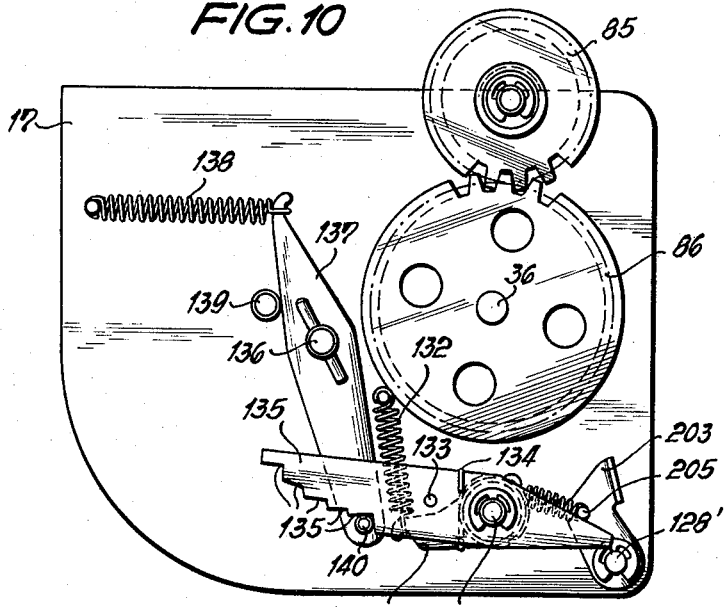
Figure 11:
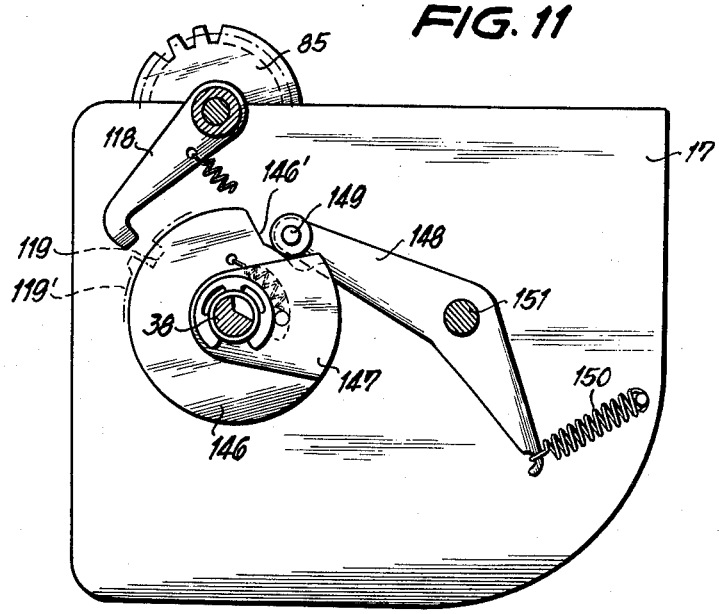

FIG. 10 illustrates the elements in a position assumed when the apparatus does not operate. When a dispensing operation is to be started after setting of the control meter number wheels 37 by the push buttons 129, a handle 141, (see FIG. 9a), is operated to turn shaft 136 so that lever 137 is turned in clockwise direction as viewed in FIG. 10 against the action of spring 138. This turning movement effects the opening of a dispensing valve 230. Since pin 140 moves to the left as viewed in FIG. 10, stepped lever 135 moves downward under the action of spring 134 and pin 140 is located in the outermost step 135' of lever 135.

The number wheels of the meters 2 and 3 turn, and the feeler rolls 124 of levers 123 move along the flange 121 of the part 106 of the respective number wheel 37 of control meter 3. During this operation, the number wheels 37 of control meter 3 are successively stopped in zero position starting from the highest order. When the penultimate number wheel arrives in zero position, only the feeler roll 124 of the number wheel 37 associated with the unit order runs on the respective flange 121 and since this flange has two cam dwells, as shown in FIG. 12, lever 103 is rocked so that stepped lever 135 is also rocked through shaft 130. Pin 140 is permitted to move step by step along lever 135, so that lever 137 turns in counter clockwise direction as viewed in FIG. 10 and effects turning of shaft 136 by which the dispensing valve 230 is closed. When the number wheel 37 of the lowest order arrives in zero position, all feeler rolls 124 can fall into the recesses 122 of the associated number wheels, and effect complete closing of the dispensing valve 230. In this position, actuating lever 142 (see FIG. 2d) which corresponds to lever 79 in FIG. 2b, is released by latch 143, so that spring 144 turns actuating lever 142 to effect this connection of coupling 55. Latch 143 is held in the blocking position shown in FIG. 2d by a pin 145 abutting lever 123 under the action of a spring. When the roller 124 falls into recess 122 of the number wheel 37 of the unit order, the respective lever 123 permits the movement of pin 145 and of latch 143 into a position in which lever 142 is released for actuation of coupling 55.

Shaft 128' turnably supports two shifting members 203, 204 (see FIGS. 9a and 10) which are connected by pins 205 and a spring to the stepped lever 135. Push buttons 206, 207 (see FIG. 1) are located opposite the shifting members 203 and 204, respectively, and when push buttons 206, 207 are actuated, stepped lever 135 is raised so that lever 137 can turn in counter clockwise direction under action of spring 138 to effect closing of the dispensing valve by shaft 136. This is done if the apparatus has to be stopped during the dispensing operation before the selected preset amount of fluid is dispensed, which may be necessary when the dispensing operation is not proceeding properly, for example, when the gasoline tank of a car runs over. Regardless of whether the dispensing valve is closed in the zero position of the control meter, or by the manual operation of push buttons 206, 207, coupling 55 is disconnected, and the main meter 2 continues to operate as long as shaft 42 is driven from shaft 38 (see FIGS. 2 and 2a) under the action of dispensed fluid.

FIG. 9 illustrates further elements which serve to prevent improper operation of the dispensing apparatus. This device is intended to prevent the actuation of the meters during the clearing operation by operating means 1, and to prevent the clearing of the meters by operating means 81 during a measuring operation of the meters. A disc 155 is non-turnably mounted on shaft 36 and has a peripheral recess 155' cooperating with a pin 156 of a lever 157 which is non-turnably mounted on shaft 136 by which the dispensing valve is operated. The position of disc 155 is so chosen that pin 156 falls into recess 155' when operating means 81 is in the control position I. As previously explained, operating means 81 is connected by a member 87 to shaft 33 of meter 2, which drives shaft 36 through gears 82, 85, and 86. Consequently, the position of disc 155 is determined by the turning of the operating means. A lever 161 is non-turnably mounted on shaft 130 and is operatively connected to a lever 160 which is turnably mounted on shaft 130. Lever 161 carries a latch 162 which has a surface 162' cooperating with a pin 163 on disc 155, and a catch 162" cooperating with a pin 164 on supporting plate 17. Lever 160 has two catch projections 160', 160" which alternately cooperate with a pair of pins 158 and 159 fixed on lever 157.

When in the zero position of the control meter 3, the feeler rolls 124 fall into the recesses 122, stepped lever 135 is rocked so that lever 130, and thereby levers 160 and 161 turn in counter clockwise direction as viewed in FIG. 9. Catch 160" engages pin 158, and locks lever 157 in the position illustrated in FIG. 9. In this manner, turning of lever 157, and of shaft 136 is prevented, so that the dispensing valve cannot be operated again after it was automatically closed under control of control meter 3.

When operating means 81 is now turned to clear the main meter 2, disc 155 turns in clockwise direction as viewed in FIG. 9. Recess 155' moves away from pin 156, while pin 163 engages lever 160 and turns the same downwardly so that lever 160 assumes a position in which pin 158 is released, and pin 158 is engaged by catch 160'. Lever 157, shaft 136, and the dispensing valve are again locked.

During further turning of operating means 81 pin 163 turns through 360°, and engages surface 162' of latch 162 so that the same is turned in clockwise direction and catch 162" is released by pin 164, so that lever 161 is free to turn in counter clockwise direction together with shaft 130 and levers 123 until the feeler rolls 124 of levers 123 engage the flange 121 of part 106 of the number wheels 37 (see also FIGS. 2d, 12 and 13). Spring 165 effects turning of lever 160 so that pin 159 is released in the control position II. When operating means 81 is turned from control position II back to control position I, disc 155 is again turned into the position illustrated in FIG. 9 in which the apparatus can be started.

The printing mechanism is illustrated in FIGS. 15 to 17. The set of printing rolls which have type faces corresponding to the indicia on the meters, are driven by gear means 166 connected to a gear 167 which meshes with pinion 168. Pinion 168 is connected through a resilient coupling 172 to the first printing wheel 28 which is connected for rotation with a star wheel 169 cooperating with a positioning member 170 having a projection 171. Shortly before the printing hammer 31 is operated, the printing wheels are properly positioned by engagement between projection 171 and a recess in the star wheel 169. In this manner it is assured that a printing type surface is located opposite the hammer 31. Coupling 172 is necessary since the first printing wheel may be turned when positioned by member 171 so that the elastic coupling 172 prevents a transmission of this motion to the drive.

After a printing operation, shaft 27 is turned to return the printing wheels 28 to zero position. Shaft 27 is turned by a gear 84 (see also FIG. 1) which is connected by a member 173 with a gear 174. Gear 84 is connected to the operating means 81 by gears 83 and 82, and turns through the same angle as operating means 81, namely first in forward direction through an angle of substantially 410°, and then in opposite direction through substantially 50°, as explained with reference to FIG. 7. Shaft 27, however, does not perform the return movement from position II to position I, but only turns through substantially 365° in forward direction corresponding to the turning direction of the printing wheels 28, and then 5° in opposite direction. The shorter angular return movement of shaft 27 is obtained by a small coupling projection, not shown, of member 173 which engages a corresponding peripheral groove in the printing wheel shaft 27, and can be turned in this groove through a corresponding angle.

In order to position the other printing wheels, which do not cooperate with member 170, 171, a pin 175 is provided and cooperates with a lever 176 arranged at the free end of shaft 177. Shaft 177 has arms 178 carrying springs 179 engaging the drive wheels of the printing wheels, and positioning the same. Springs 179 are normally retracted from the wheels 118.

The printing operation, and the loading of the printing hammer 31 is obtained by the following mechanism: A gear 174 meshes with a gear 181 which is mounted on a pin 182 together with a lever 183'. The same pin 182 movably supports a cam 183 provided with a slot 184 engaged by a pin 185 of a gear 181. Cam 183 carries a pin 186 on which a pawl 187 is turnably mounted. Cam 183 has a gradually rising cam track with a steep shoulder, best seen in FIG. 16a, and has a small depression at the highest point of the dwell. A roller 188' on a lever 188 engages the small depression in the control positions I and II of the operating means 81. A shaft 189 carries a lever 188, and the lever 190 of the hammer 31. Lever 190 has a rubber cushion 191 and two lateral pins 192 to which two springs 193 are attached. Springs 193 tend to press the printing hammer 190, 31 against the printing wheels 28, but cam 183 normally prevents such movement by blocking turning movement of lever 188 and shaft 189.

During the clearing operation of operating means 81, gear 181 and gear 174 turn through 410° in one direction, and then 50° in the opposite direction. Only 360° of the turning movement of gear 181 are to be transferred to cam 183. At the beginning of the clearing operation, pin 185 is in the position shown in FIG. 16a. Since gear 181 turns in clockwise direction as viewed in FIG. 16, pin 185 engaging member 187 turns cam 183 in clockwise direction as viewed in FIG. 16a so that roller 188' drops inwardly in radial direction to the inner cam track portion resulting in turning of levers 188 and 190 so that a copy sheet is urged by printing hammer 31 against the respective printing surfaces of the printing wheels 28, and an imprint is made.

The rubber cushions 191 on printing lever 190 engage an abutment in the printing position of the printing hammer and are slightly compressed during the printing operation so that printing hammer 31 is immediately raised from the copy sheet by resilient expansion of the rubber cushions 191. This releases the copy sheet for removal.

During the turning of cam 183, roller 188' moves along the cam track and engages lever 187 shortly before one revolution is completed. Lever 187 is rocked and releases pin 185. Since cam 183 is further rotated from gear 181 through pin 185, pin 185 travels in the curved slot 184 in clockwise direction until pin 185 reaches the end of slot 184 corresponding to the terminal position of cam 183.

During the rearward turning movement of the operating means 81 from the position II to the position I, which is transferred to gear 181, pin 185 travels in opposite direction in the curved slot 184 so that lever 187, released in the meantime by roller 188', drops into a position located behind pin 185 so that during the next following clearing operation cam 183 is again turned.

Figure 4:
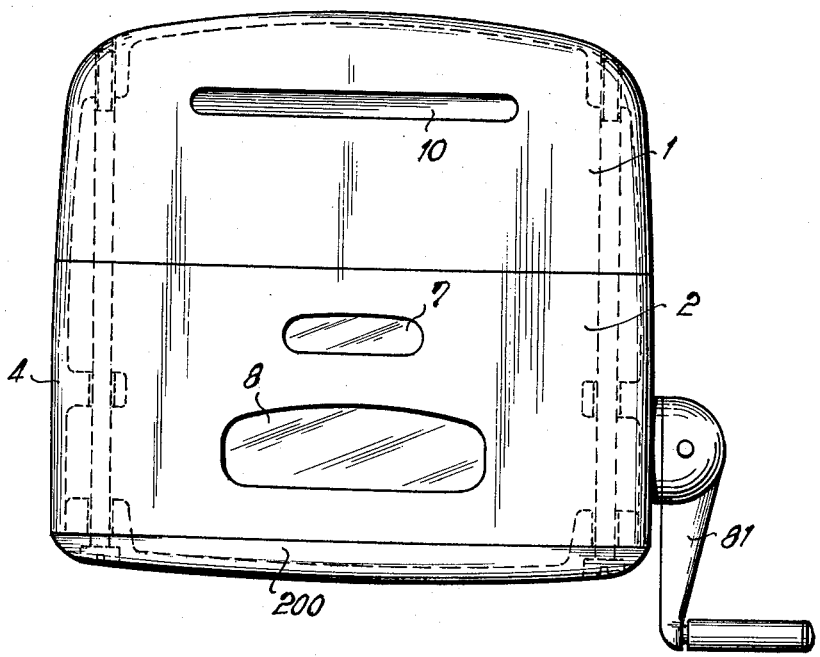
FIG. 4 shows a modified arrangement in which only the meter for the dispensed amount of fluid, and the associated printing means are located in a casing.

A projecting arm member 183' is connected to cam 183 for rotation, and actuates a lever 194 which effects turning of lever 195 on which it is mounted. Lever 195 is fixed to a shaft 196 (see FIG. 15) so that this shaft is turned in clockwise direction. Since shaft 196 carries a lever 197 which is connected to the positioning means 170 of the printing wheel 28 of the lowermost order, this printing wheel is also accurately positioned. The printing means are also provided with a paper guide 198 as shown in FIG. 15. As shown in FIG. 4, the main meter 2 can be mounted in a common casing with the printing means 1 in which event casing 5 is closed by a bottom cover 200. The meter and the printing means are cleared by operation of the operating means 81 as described with reference to the embodiment in which the control meter 3 is also provided. The casing part 5 has an observation window 7 for the totaliser 35 and a window 8 for the main meter 2. The casing of the printing means is provided with a slot 10 for insertion of a copy sheet or paper band, which is also shown in FIG. 2.

Figure 5:
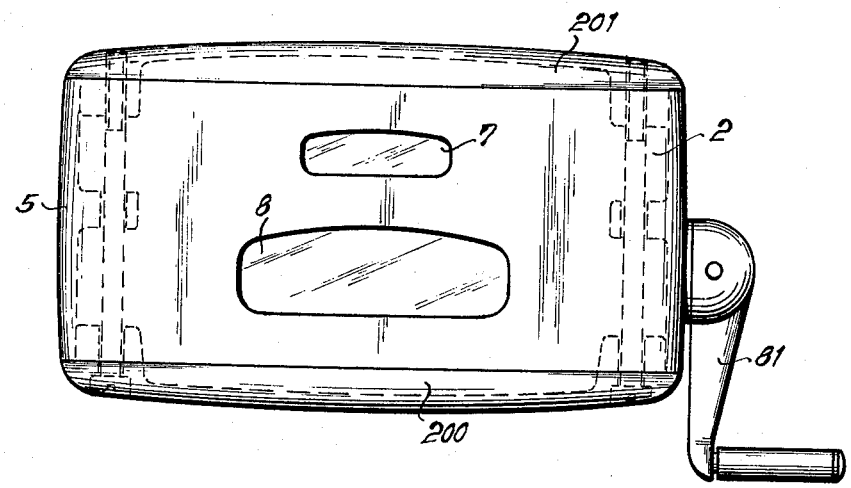
FIG. 5 shows an arrangement in which the casing part of the main meter used in the embodiment of FIG. 1 is closed to provide a casing for the main meter only.
Figure 6:
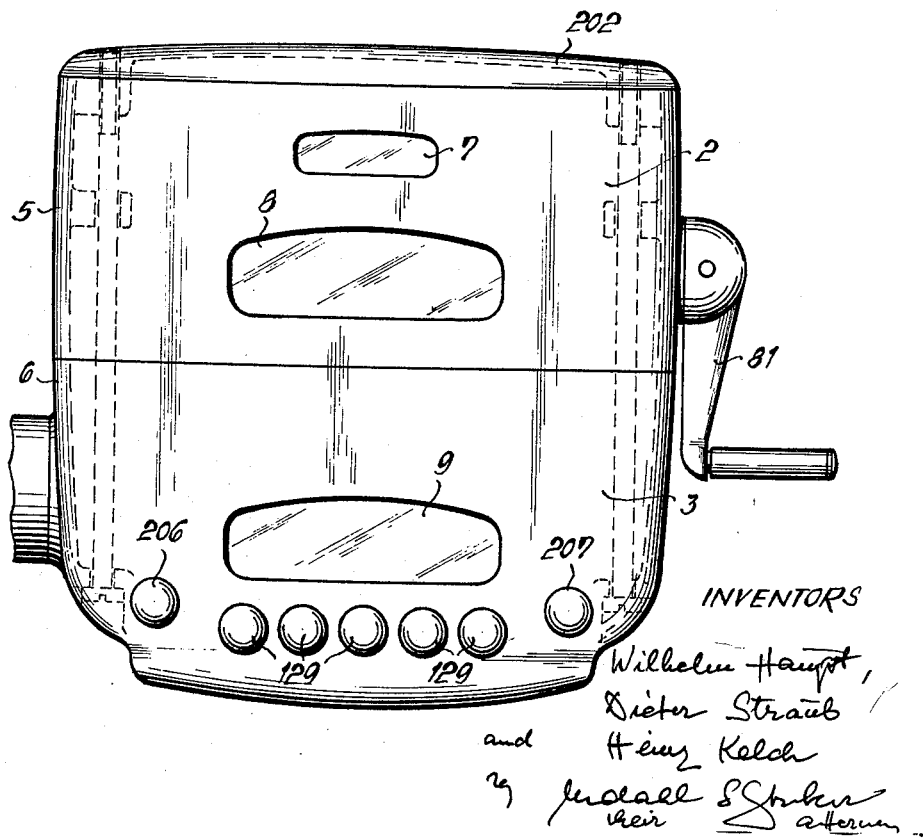
FIG. 6 shows an arrangement in which only the casings of the control meter and of the main meter are combined and closed to form a casing.

FIG. 5 shows that the casing 5 can be closed by top plate 201 and bottom plate 200 if the main meter is to be provided with a separate casing. FIG. 6 shows a casing including casing part 5 for housing the main meter 2, and casing part 6 for housing the control meter 3. A top cover 202 closes the casing 5. In the embodiment of FIG. 6, the printing means are omitted, so that the operator relies only on the indications of the meters viewed through windows 8 and 9.

It will be understood that each of the elements described above, or two or more together, may also find a useful application in other types of meter arrangement for controlling the dispensing of a fluid differing from the types described above.

While the invention has been illustrated and described as embodied in a meter arrangement including a main meter for measuring a dispensed quantity of a fluid, a control meter for automatically closing a dispensing valve, and a single operating means for both meters, it is not intended to be limited to the details shown, since various modifications structural changes may be made without departing in any way from the spirit of the present invention.

Without further analysis, the foregoing will so fully reveal the gist of the present invention that others can by applying current knowledge readily adapt if for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Meter arrangement comprising, in combination, control means for controlling the dispensing of a fluid; first meter means for measuring a dispensed quantity of the fluid and having an initial zero position; second meter means settable to a selected preset initial position corresponding to a selected amount to be dispensed and operatively connected to said first meter means to move from said selected preset initial position to a zero position while a dispensed quantity is measured by said first meter means, said second meter means being operatively connected to said control means to actuate the same to effect stopping of the dispensing of the fluid when said second meter means arrives at said zero position; printing means operatively connected to said first meter means for movement with the same between printing positions representing the respective amounts of dispensed fluid; and a single operating means operatively connected to said first and second meter means and to said printing means for simultaneously returning said first and second meter means to the initial positions thereof and for effecting a printing operation of said printing means in the final printing position of the same, and thereupon clearing of said printing means.

2. Meter arrangement comprising, in combination, control means for controlling the dispensing of a fluid; first meter means for measuring a dispensed quantity of the fluid and having an initial zero position; second meter means settable to a selected preset initial position corresponding to a selected amount to be dispensed and operatively connected to said first meter means to move from said selected preset initial position to a zero position while a dispensed quantity is measured by said first meter means, said second meter means being operatively connected to said control means to actuate the same to effect stopping of the dispensing of the fluid when said second meter means arrives at said zero position; setting means operatively connected to said second meter means for setting said second meter means; locking means for locking said setting means; and a single operating means operatively connected to said first and second meter means for simultaneously returning said first and second meter means to the initial positions thereof, said operating means being movable between a first control position and a second control position and being operatively connected to said locking means to effect release of said setting means during movement to said second control position, said first and second meter means being operative in said first control position of said operating means.

3. Meter arrangement comprising, in combination, control means for controlling the dispensing of a fluid; first meter means for measuring a dispensed quantity of the fluid; second meter means settable to a selected preset position corresponding to a selected amount to be dispensed and operatively connected to said first meter means to move from said preset position to a zero position while a dispensed quantity is measured by said first meter means, said second meter means being operatively connected to said control means to actuate the same to effect stopping of the dispensing of the fluid when said second meter means arrives at said zero position; setting means operatively connected to said second meter means for setting said second meter means; locking means for locking said setting means; and a single operating means operatively connected to said first and second meter means for simultaneously returning said first and second meter means to the initial positions thereof, said operating means being turnable through a selected angle smaller than 360° between a first control position and a second control position and being operatively connected to said locking means to effect release of said setting means during movement to said second control position through said selected angle, said first and second meter means being operative in said first control position of said operating means, said operating means being further turnable beyond said second control position through an angle of 360° to assume again said second control position, said operating means returning said first meter means to the zero position thereof and said second meter means to said preset position during said turning movement through 360°.

4. Meter arrangement comprising, in combination, control means for controlling the dispensing of a fluid; first meter means for measuring a dispensed quantity of the fluid; second meter means settable to a selected preset position corresponding to a selected amount to be dispensed and operatively connected to said first meter means to move from said preset position to a zero position while a dispensed quantity is measured by said first meter means, said second meter means being operatively connected to said control means to actuate the same to effect stopping of the dispensing of the fluid when said second meter means arrives at said zero position; printing means operatively connected to said first meter means for movement with the same between printing positions representing the respective amounts of dispensed fluid; operating means turnable and having a first control position and a second control position, and being operatively connected to said first and second meter means so that the same are operative in said first control position of said operating means, and so that said second meter means is settable to a new preset position only in said second control position, said operating means being further turnable through and beyond said second control position through an angle of 360° to assume again said second control position, said operating means being operatively connected to said first and second meter means to return said first meter means to the zero position thereof and said second meter means to said preset position during said turning movement through 360°, said operating means being also connected to said printing means to actuate the same during the first turning thereof from said first control position to said second control position to effect a printing operation of said printing means in the final printing position of the same, and to clear said printing means during said turning movement through 360°.

5. Meter arrangement, comprising in combination, control means for controlling the dispensing of a fluid; first meter means for measuring a dispensed quantity of the fluid; second meter means settable to a selected preset position corresponding to a selected amount of fluid to be dispensed and operatively connected to said control means to actuate the same to effect stopping of the dispensing of the fluid when said second meter means arrives at its zero position; and coupling means having a coupling position for operatively connecting said second meter means with said first meter means so that said second meter means moves to said zero position while a dispensed quantity is measured by said first meter means, said coupling means being operatively connected to said second meter means and controlled by the same to move to a disengaged position when said second meter means arrives at said zero position whereby said first meter means continues to measure excess amount of the fluid dispensed after said second meter means in said zero position has actuated said control means to effect stopping of the dispensing of fluid.

6. Meter arrangement, comprising in combination, control means for controlling the dispensing of a fluid; first meter means for measuring a dispensed quantity of the fluid; second meter means settable to a selected preset position corresponding to a selected amount of fluid to be dispensed and operatively connected to said control means to actuate the same to effect stopping of the dispensing of the fluid when said second meter means arrives at its zero position; coupling means having a coupling position for operatively connecting said second meter means with said first meter means so that said second meter means moves to said zero position while a dispensed quantity is measured by said first meter means, said coupling means being operatively connected to said second meter means and controlled by the same to move to a disengaged position when said second meter means arrives at said zero position whereby said first meter means continues to measure excess amounts of the fluid dispensed after said second meter means in said zero position has actuated said control means to effect stopping of the dispensing of fluid; and a single operating means operatively connected to said first and second meter means for simultaneously returning said first meter means to the zero position thereof and said second meter means to said preset position.

7. A metering arrangement as set forth in claim 6 and including a totaliser mechanism for indicating the total amount of fluid dispensed; transmission means connecting said first meter means with said totaliser so that the latter is actuated by the former, said connecting means including other mechanical coupling means, and means connecting said other coupling means to said operating means for moving said other coupling means to a disconnected position while said operating means returns said first meter means to said zero position.

8. A meter arrangement as set forth in claim 6 and including printing means; and transmission means connecting said printing means with said first meter means so that operation of said first meter means effects movement of said printing means between printing positions representing measured amounts, said transmission means including further mechanical coupling means, and means connecting said further coupling means to said operating means for moving said further coupling means to a disconnected position during part of the movement of said operating means.

9. Meter arrangement, comprising in combination, control means for controlling the dispensing of a fluid; first meter means for measuring a dispensed quantity of the fluid; second meter means settable to a selected preset position corresponding to a selected amount of fluid to be dispensed and operatively connected to said control means to actuate the same to effect stopping of the dispensing of the fluid when said second meter means arrives at its zero position; coupling means having a coupling position for operatively connecting said second meter means with said first meter means so that said second meter means moves to said zero position while a dispensed quantity is measured by said first meter means, said coupling means being operatively connected to said second meter means to move to a disengaged position when said second meter means arrives at said zero position whereby said first meter means continues to measure excess amounts of the fluid dispensed after said second meter means in said zero position has actuated said control means to effect stopping of the dispensing of fluid; and operating means turnable through a selected angle smaller than 360° between a first control position and a second control position and being operatively connected to said first and second meter means so that the same are operative in said first control position, and so that said second meter means is settable to a new preset position only in said second control position, said operating means being further turnable through and beyond said second control position through an angle of 360° to assume again said second control position, said operating means being operatively connected to said first and second meter means to return said first meter means to the zero position thereof and said second meter means to said preset position during said turning movement through 360° so that said second meter means may be maintained in the previously set preset position, or may be reset for dispensing a different amount of fluid.

10. Meter arrangement, comprising in combination, control means for controlling the dispensing of a fluid; first meter means for measuring a dispensed quantity of the fluid; second meter means settable to a selected preset position corresponding to a selected amount of fluid to be dispensed and operatively connected to said control means to actuate the same to effect stopping of the dispensing of the fluid when said second meter means arrives at its zero position; coupling means having a coupling position for operatively connecting said second meter means with said first meter means so that said second meter means moves to said zero position while a dispensed quantity is measured by said first meter means, said coupling means being operatively connected to said second meter means to move to a disengaged position when said second meter means arrives at said zero position whereby said first meter means continues to measure excess amount of the fluid dispensed after said second meter means in said zero position has actuated said control means to effect stopping of the dispensing of fluid; printing means operatively connected to said first meter means for movement with the same between printing positions representing the respective amount of dispensed fluid; and operating means turnable through a selected angle smaller than 360° between a first control position and a second control position and being operatively connected to said first and second meter means so that the same are operative in said first control position, and so that said second meter means is settable to a new preset position only in said second control position, said operating means being further turnable beyond said second control position through an angle of 360° to assume again said second control position, said operating means being operatively connected to said first and second meter means to return said first meter means to the zero position thereof and said second meter means to said preset position during said turning movement through 360° so that said second meter means may be maintained in the previously set preset position, or may be reset for dispensing a different amount of fluid, said operating means being also connected to said printing means to actuate the same during movement through said selected angle to effect a printing operation of said printing means in the final printing position of the same, and to clear said printing means during said turning movement through 360°.

11. A metering arrangement as set forth in claim 10 and including a totaliser mechanism for indicating the total amount of fluid dispensed; transmission means connecting said first meter means with said totaliser so that the latter is actuated by the former, said connecting means including other coupling means; and means connecting said other coupling means to said operating means for moving said other coupling to a disconnected position while said operating means return said first meter means to said zero position.

12. Meter arrangement comprising, in combination, control means for controlling the dispensing of a fluid; first meter means for measuring a dispensed quantity of the fluid and having an initial zero position; a first casing means for housing and supporting said first meter means; second meter means settable to a selected preset initial position corresponding to a selected amount to be dispensed and operatively connected to said first meter means to move from said selected preset initial position to a zero position while a dispensed quantity is measured by said first meter means, said second meter means being operatively connected to said control means to actuate the same to effect stopping of the dispensing of the fluid when said second meter means arrives at said zero position; a second casing means for housing and supporting said second meter means; means for detachably attaching said first casing means to said second casing means; printing means operatively connected to said first meter means for movement with the same between printing positions representing the respective amounts of dispensed fluid; a third casing means housing and supporting said printing means; means for detachably attaching said third casing means to said second casing means; and a single operating means mounted on said second casing means and operatively connected to said first and second meter means and to said printing means for simultaneously returning said first and second meter means to the initial positions thereof and for effecting a printing operation of said printing means in the final printing position of the same, and for thereupon effecting clearing of said printing means.

13. Meter arrangement, comprising, in combination, control means for controlling the dispensing of a fluid; first meter means for measuring a dispensed quantity of the fluid; second meter means settable to a selected preset position corresponding to a selected amount of fluid to be dispensed and operatively connected to said control means to actuate the same to effect stopping of the dispensing of the fluid when said second meter means arrives at its zero position; coupling means having a coupling position for turnably connecting said second meter means with said first meter means during rotation in opposite directions so that said second meter means moves to said zero position while a dispensed quantity is measured by said first meter means, said coupling means having a disengaged position, and including a shifting means shiftable between a position in which said coupling means is in said coupling position and an operative position in which said coupling means is in said disengaged position, said shifting member being operatively connected to said second meter means to move said coupling means to said disengaged position when said second meter means arrives at said zero position whereby said first meter means continues to measure excess amounts of the fluid dispensed after said second meter means in said zero position has actuated said control means to effect stopping of the dispensing of fluid.

14. A meter arrangement as set forth in claim 13 wherein said coupling means comprises a first coupling part including a cam member, a second coupling part including a cage member surrounding said cam member; a plurality of pairs of coupling members located between said cam member and said cage member; spring means between the coupling members of each pair of coupling members for urging the same apart to positions wedged between said cam member and said cage member whereby said coupling parts are connected for rotation in opposite directions; and wherein said shifting means effects movement of the coupling members of each pair of coupling members toward each other to a more closely spaced position in which said coupling members are located between wider spaced portions of said cam member and said cage member whereby said coupling means is disengaged.

15. A meter arrangement as set forth in claim 13 wherein said coupling means comprises a first coupling part including a cam member, a second coupling part including a cage member surrounding said cam member; a plurality of pairs of coupling members located between said cam member and said cage member; spring means between the coupling member of each pair of coupling members for urging the same apart to positions wedged between said cam member and said cage member whereby said coupling parts are connected for rotation in opposite directions; and wherein said shifting means includes wedge members located between adjacent coupling members of different pairs of coupling members, said wedge members being movable between a position releasing the adjacent coupling members so that the same are urged by said spring means to said wedged positions, and an operative position forcing the adjacent coupling members apart so that the coupling members of each pair of coupling members move toward each other to a more closely spaced position in which said coupling members are located between wider spaced portions of said cam member and of said cage member whereby said coupling means is disengaged.

16. An arrangement as set forth in claim 14 wherein said coupling members are balls, wherein said cage member is circular, and wherein said cam member has at least three cam faces each of which has a greater radius of curvature than said circular cage member, and wherein a pair of said coupling balls is located on each of said cam faces.

17. An arrangement as set forth in claim 15 and including a driver shaft fixedly connected to said cam member for rotating the same and supporting said cage member for free turning movement and non-movable in axial direction; said cam member having an axially extending recess; and wherein said shifting means includes a guide ridge extending in axial direction and located in said recess of said cam member so that said wedge-shaped members move in axial direction when said shifting means is operated.

18. An arrangement as set forth in claim 13 wherein said coupling means comprising a first coupling part including a cam member having an endless peripheral cam track including a plurality of cam track portions; a second coupling part including a cage member surrounding said cam member and being more closely spaced from the outer ends of said cam track portions than from the central portions of same; a pair of coupling members located between each cam track portion and said circular cage member; spring means between the coupling members of each pair of coupling members for urging the same apart to positions wedged between the outer ends of the respective cam track portion and said cage member whereby said coupling parts are connected for rotation in opposite directions; and wherein said shifting means include a plurality of wedge members located between adjacent coupling members of different pairs of coupling members and between adjacent cam track portions of said cam track portions, said wedge members being movable in axial direction between a position releasing the adjacent coupling members so that the same are urged by said spring means to said wedged positions, and an operative position forcing the adjacent coupling members apart so that the coupling members of each pair of coupling members move toward each other to a more closely spaced position in which said coupling members are located between said central portions and said cage member whereby the coupling is disengaged.

References Cited in the file of this patent

UNITED STATES PATENTS

| | | |
|---|---|---|
| 1,759,396 | Granberg | May 20, 1930 |
| 1,831,965 | Marden | Nov. 17, 1931 |
| 2,534,979 | LeClair | Dec. 19, 1950 |
| 2,540,617 | Hazard et al. | Feb. 6, 1951 |
| 2,665,030 | Vroom | Jan. 5, 1954 |
| 2,846,119 | Robbins | Aug. 5, 1958 |
| 2,940,638 | Maloof et al. | June 14, 1960 |